(12) United States Patent
Greiner

(10) Patent No.: US 10,215,228 B2
(45) Date of Patent: Feb. 26, 2019

(54) COMPOUND LINEAR GUIDE HAVING A FASTENING MEANS

(71) Applicant: WEISS GmbH, Buchen (DE)

(72) Inventor: Heinz Greiner, Ebersbach (DE)

(73) Assignee: WEISS GMBH, Buchen (DE)

( * ) Notice: Subject to any disclaimer, the term of this patent is extended or adjusted under 35 U.S.C. 154(b) by 0 days.

(21) Appl. No.: 15/500,796

(22) PCT Filed: Dec. 16, 2015

(86) PCT No.: PCT/EP2015/079994
§ 371 (c)(1),
(2) Date: Jan. 31, 2017

(87) PCT Pub. No.: WO2016/096987
PCT Pub. Date: Jun. 23, 2016

(65) Prior Publication Data
US 2017/0276174 A1     Sep. 28, 2017

(30) Foreign Application Priority Data
Dec. 18, 2014   (DE) .......................... 10 2014 119 113

(51) Int. Cl.
*F16C 29/00* (2006.01)
*F16C 29/06* (2006.01)
(Continued)

(52) U.S. Cl.
CPC .............. *F16C 29/005* (2013.01); *B23Q 3/15* (2013.01); *F16C 29/063* (2013.01);
(Continued)

(58) Field of Classification Search
CPC .... F16C 13/006; F16C 29/063; F16C 29/045; F16C 29/0642; F16C 29/064;
(Continued)

(56) References Cited

U.S. PATENT DOCUMENTS 4,869,600 A * 9/1989 Tonogai .............. F16C 29/0602
384/43
4,934,835 A * 6/1990 Albert ...................... B23Q 1/58
384/15
(Continued)

FOREIGN PATENT DOCUMENTS

DE       16847 A     5/1959
DE    2729354 A1    1/1978
(Continued)

OTHER PUBLICATIONS

German Patent Office Communication dated Aug. 14, 2015 for German Application No. 10 2014 119 113.7, 2 pages.
(Continued)

*Primary Examiner* — Marcus Charles
(74) *Attorney, Agent, or Firm* — Cantor Colburn LLP

(57) ABSTRACT

A transfer system for transporting objects is disclosed. It includes a guide rail, which has a light-metal main body and at least one guide element, which is connected to the light-metal main body and has a guide surface. A slide for accommodating at least one object and a bearing, which interacts with the guide element and supports the slide on the guide rail in such a way that the slide can move linearly is also included. The guide rail has at least one magnetic fastening means, which makes it possible to temporarily fasten the guide rail by magnetic clamping, in particular in order to process the guide surface.

20 Claims, 3 Drawing Sheets

(51) Int. Cl.
*F16C 33/61* (2006.01)
*F16C 33/64* (2006.01)
*B23Q 3/15* (2006.01)

(52) U.S. Cl.
CPC ........ *F16C 29/065* (2013.01); *F16C 29/0642* (2013.01); *F16C 33/61* (2013.01); *F16C 33/64* (2013.01); *F16C 2202/40* (2013.01); *F16C 2220/60* (2013.01); *F16C 2226/18* (2013.01); *Y10T 29/49641* (2015.01)

(58) Field of Classification Search
CPC ...... F16C 29/065; F16C 29/005; F16C 33/61; F16C 33/64; F16C 2226/18; F16C 2322/39; F16C 2220/70; F16C 2220/60; F16C 2202/40; F16C 2202/42; B23Q 3/15; B23Q 1/40; B23Q 1/44; B23Q 41/02; H02K 5/16; Y10T 29/49641; B23B 11/002
USPC .... 384/7–8, 41, 49–50, 55, 57, 42; 310/135; 29/898.03; 269/8, 48, 97; 335/290, 295
See application file for complete search history.

(56) References Cited

U.S. PATENT DOCUMENTS

| | | | | |
|---|---|---|---|---|
| 5,431,498 A * | 7/1995 | Lyon | ............ | F16C 29/005 384/45 |
| 5,540,503 A * | 7/1996 | Ikegame | ............ | F16C 29/045 384/50 |
| 5,755,515 A * | 5/1998 | Senjo | ............ | B23Q 1/01 384/45 |
| 5,806,986 A * | 9/1998 | Barth | ............ | B23Q 1/0018 384/45 |
| 6,346,788 B1 * | 2/2002 | Nagai | ............ | B23Q 11/08 318/432 |
| 7,448,134 B2 * | 11/2008 | Nagai | ............ | F16C 29/005 148/607 |
| 7,717,622 B2 * | 5/2010 | Winkler | ............ | F16C 29/0604 384/15 |
| 8,313,239 B2 * | 11/2012 | Ju | ............ | B23Q 1/262 384/45 |
| 8,430,568 B2 * | 4/2013 | Pfister | ............ | F16C 29/0604 384/43 |
| 8,490,955 B2 * | 7/2013 | Sarh | ............ | B21J 15/14 269/17 |
| 2002/0164095 A1 * | 11/2002 | Nagai | ............ | F16C 29/005 384/49 |
| 2004/0083933 A1 * | 5/2004 | Baric | ............ | F16C 29/04 108/143 |
| 2007/0103008 A1 * | 5/2007 | Miyamoto | ............ | H02K 41/03 310/12.19 |
| 2007/0189647 A1 * | 8/2007 | Keller | ............ | F16C 29/008 384/57 |
| 2009/0152961 A1 * | 6/2009 | Vaucher | ............ | G01D 5/2451 310/12.19 |
| 2009/0263056 A1 * | 10/2009 | Fleisch | ............ | F16C 13/006 384/57 |
| 2011/0052348 A1 * | 3/2011 | Hanamura | ............ | H02K 16/00 414/225.01 |

FOREIGN PATENT DOCUMENTS

| | | | | |
|---|---|---|---|---|
| DE | 2757418 A1 | 6/1978 | | |
| DE | 4417136 A1 | 11/1995 | | |
| DE | 19842384 A1 | 3/2000 | | |
| DE | 10243019 A1 | 3/2004 | | |
| EP | 0774592 A2 | 5/1997 | | |
| EP | 1803949 A1 | 7/2007 | | |
| EP | 1808608 A1 | 7/2007 | | |
| EP | 2110571 A2 | 10/2009 | | |
| JP | 01206805 A * | 8/1989 | ............ | B60L 13/10 |
| JP | 2002096233 A * | 4/2002 | ............ | B23Q 5/28 |
| JP | 2016178749 A * | 10/2016 | ............ | H02K 41/035 |
| WO | WO-2005062446 A1 * | 7/2005 | ............ | E01B 25/32 |

OTHER PUBLICATIONS

English Translation of International Preliminary Report on Patentability for International Application No. PCT/EP2015/079994; dated Dec. 16, 2015; 6 pages.

* cited by examiner

COMPOUND LINEAR GUIDE HAVING A FASTENING MEANS

CROSS REFERENCE TO RELATED APPLICATIONS

This application is a National Phase Application of Patent Application PCT/EP2015/079994 filed on 16 Dec. 2015, which claims priority to DE102014119113.7, filed 18 Dec. 2014, both of which are hereby incorporated by reference in their entirety.

The present invention relates to a transfer system for the transport of objects having a guide rail that has a light metal base body and at least one guide element connected to the light metal base body and having a guide surface; having a slide for receiving at least one object; and having a bearing that linearly displaceably supports the slide at the guide rail.

A transfer system of the initially named kind is used, for example, in automation technology to transport objects from one location to another location; for example, from one production step to the next. The objects are positioned on slides for this purpose and the slides are traveled along a guide rail.

It is known to manufacture guide rails as compound elements. In such so-called compound linear guides, the body is, for example, produced from light metal, for instance aluminum. Wires or shafts of steel that are introduced into the body, e.g. by insertion or rolling in, serve as guide elements. Such known compound linear guides have in particular proved to be rather unsuitable for applications using ball guides due to their small torsional stiffness and low precision. The low precision in this respect above all relates to the insufficient parallelism of the guide elements.

It is also known to manufacture guide rails substantially completely from steel. They are as a rule better—as regards machining precision—than known compound linear guides. They do, however, suffer from the disadvantage that they are very difficult and expensive to manufacture.

BRIEF SUMMARY OF THE INVENTION

Starting from the prior art, it is the underlying object of the invention to provide a transfer system that can be manufactured comparatively easily and inexpensively and that can be produced and machined with equivalent precision in comparison with known steel guide rails. It is additionally the underlying object of the invention to provide a corresponding machining method.

The object is satisfied by a transfer system for transporting objects having features described herein and in particular in that the guide rail has at least one magnetic fixing means that allows a temporary fastening of the guide rail by means of a magnetic clamping apparatus.

The further object of the invention is satisfied by a method of machining a transfer system having features described herein.

It is the underlying general idea of the invention to clamp the guide rail in as simple a manner as possible free of tension to be able to machine the guide element in the state embedded into the light metal base body. For this purpose, at least one magnetic fixing means is provided at the guide rail to be able to magnetically clamp the guide rail for machining.

Advantageous embodiments of the invention can be seen from the dependent claims, from the description and from the drawings.

In accordance with an embodiment, the fixing means is of an areal design. In this context, areal means that the surface of the fixing means that comes into contact with the magnetic clamping apparatus is substantially planar. This has the advantage that a good force transmission can be ensured between the magnetic clamping apparatus and the fixing means.

The fixing means can furthermore be attached to at least an outer side of the guide rail. A direct force transmission is hereby likewise made possible between the magnetic clamping apparatus and the fixing means.

The fixing means can define a contact plane spaced apart from the outer side of the guide rail. This contact plane can be used for the definition of the position of the guide rail with respect to a reference system of the magnetic clamping apparatus to allow a precise, computer-controlled machining of the guide rail.

The contact plane—whether spaced apart from the outer side of the guide rail or aligned therewith—is in particular also decisive for the correct positioning of the rail in the final assembled state of the rail.

In accordance with an embodiment, a respective at least one fixing means is provided at two outer sides of the guide rail, in particular outer sides arranged inclined with respect to one another. This has the advantage that—with a suitable configuration of the magnetic clamping apparatus—the guide rail can be reliably fixed in two different dimensions. The fixing means can, for example, be provided at outer sides of the guide rail disposed perpendicular with respect to one another for a simple positioning of the guide rail.

To prevent an unwanted movement of the slide transversely to the direction of travel, the guide rail can engage around the slide at least partly from the outside or the slide can engage around the guide rail at least partly from the outside.

At least one fixing means can be let into a groove that is preferably trapezoidal to establish a reliable connection, in particular a shape matched connection, between the fixing means and the light metal base body.

To allow a high magnetic force of attraction by the magnetic clamping apparatus, the fixing means can be formed from a ferromagnetic or ferrimagnetic material, preferably from steel or iron.

If the fixing means is arranged such that it at least partly forms a contact surface or assembly surface in a final assembled state, the use of steel is accompanied by the advantage of a robust, precise, and reliable connectability of the rail to the components bearing it.

The bearing can comprise at least one roller element bearing, in particular in the manner of a ball guide, that cooperates with the guide surface of the guide element for the elimination of friction between the guide rail and the slide.

The slide can have at least one guide part that is disposed opposite the guide element of a corresponding guide rail for a more precise guidance of the slide. Such a guide part can be introduced into a groove, in particular a trapezoidal groove, of the slide by rolling in or by adhesive bonding. The guide element can be integrated into the guide rail in a similar manner. The guide part can, however, alternatively also be formed integrally at the slide. The integral manner of construction has the advantage that no additional machining step is necessary to introduce the guide part into the groove of the slide. The same applies analogously to the guide element that can be formed in one piece with the light metal base body of the guide rail.

The invention also relates, as described above, to a method of machining a transfer system for the transport of objects. The method in accordance with the invention comprises the steps:

Providing a guide rail that comprises a light metal body and a magnetic fixing means that allows a temporary fastening of the guide rail by means of a magnetic clamping apparatus; fixing the guide rail in or at a machining apparatus by means of the magnetic clamping apparatus; machining the guide rail, in particular a guide element provided for supporting a slide at the guide rail; and releasing the guide rail. This method has the advantage that a simple, tension-free clamping of the guide rail and thus a precise machining of the guide rail in a well-defined state is possible. After machining, the rail can also be released fast, whereby the process time that is required for machining the guide element can be reduced.

The machining can in this respect comprise a grinding of a guide surface of the guide element. Other machining or processing steps are, however, also possible such as drilling of holes, thread cutting, milling a groove, welding on or casting on a part, coating of a surface or similar machining or processing steps.

The machining can alternatively or additionally comprise an introduction of the guide element. The guide element can, for example, be introduced into the light metal base body by rolling in or by adhesive bonding.

The fixing of the guide rail can be carried out means of one or more electromagnets of the magnetic clamping apparatus. This has the advantage that the magnetic clamping apparatus can be switched on and off in a simple manner. Alternatively or additionally, the fixing of the guide rail can be carried out by means of a permanent magnet, whereby a connection to the grid is no longer necessary on the sole use of permanent magnets.

BRIEF DESCRIPTION OF THE SEVERAL VIEWS OF THE DRAWINGS

The invention will be described in the following using purely exemplary embodiments and with reference to the enclosed drawings. There are shown.

DETAILED DESCRIPTION OF THE INVENTION

Figure 1:
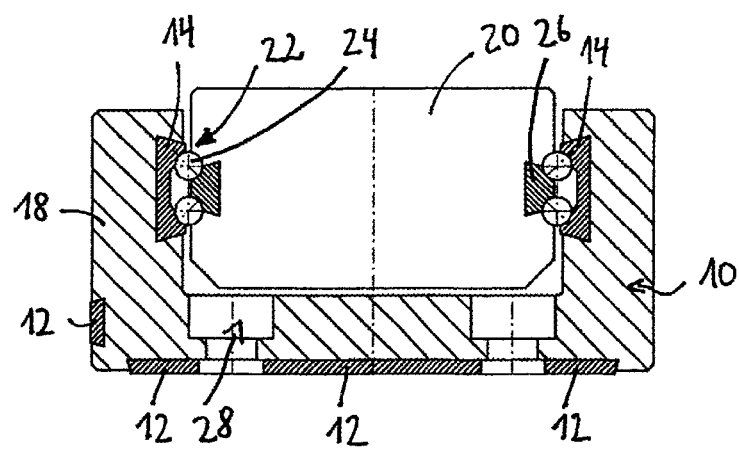
FIG. 1 a sectional view of a first embodiment of the transfer system in accordance with the invention.

FIGS. 1 to 4 show different embodiments of a guide rail 10 that are equipped with a fixing means 12 for fixing the guide rail 10 to a magnetic clamping apparatus, not shown. The guide rails 10 are furthermore each equipped with two guide elements 14 that each have a guide surface 16. Each fixing means 12 and each guide element 14 is attached to a light metal base body 18 that is not magnetic.

FIG. 1 shows an embodiment in which the guide rail 10 has a U shape and partly engages around a slide 20 from the outside. The slide 20 on which the object to be transported is arranged is linearly displaceably supported at the guide rail 10 by means of a bearing 22. The bearing 22 comprises a plurality of roller elements 24 that are arranged between the guide element 14 at the guide rail side and a guide part 26 at the slide side and that are in contact with the guide surface 16. The guide element 14, the guide part 26 and the fixing means 12 are let into trapezoidal grooves that are shaped in the light metal base body 18 or in the slide 20 and are thus fixed in a shape matched manner.

The fixing means 12 have a height H that is greater than the depth T of the respective groove. The fixing means 12 thereby project out of the guide rail 10. If a plurality of fixing means 12 are attached to a surface, their exposed surfaces lie in one plane. As can be seen in FIG. 1, an additional fixing means 12 can be attached at the side to ensure a more precise positioning of the guide rail 10 on a magnetic clamping apparatus, not shown.

Countersinks 28 are furthermore present in the guide rail 10 to screw the guide rail 10, for example, tightly to a rack, not shown, on site.

Figure 2:
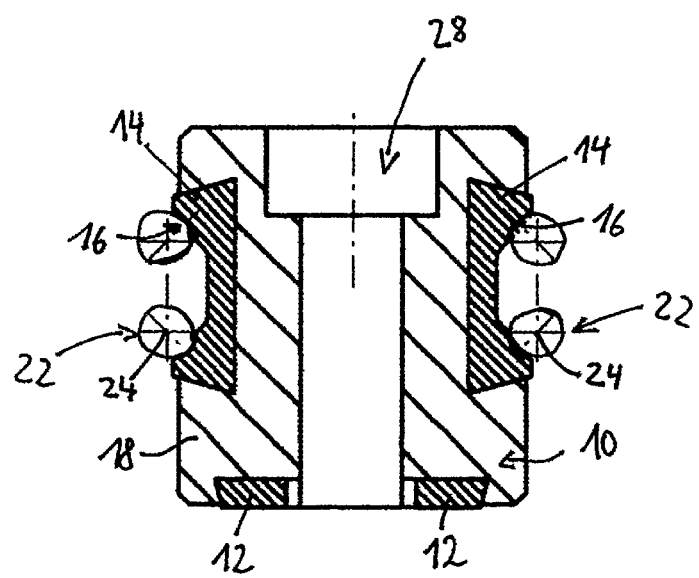
FIG. 2 a sectional view of a guide rail in accordance with a second embodiment.
Figure 3:
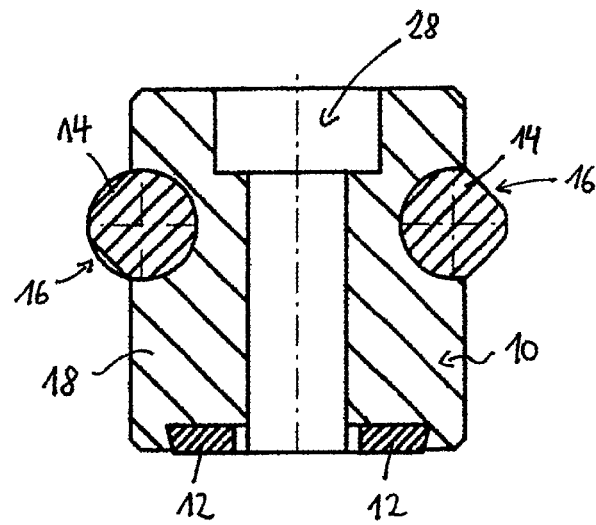
FIG. 3 a sectional view of a guide rail in accordance with a third embodiment.
Figure 4:
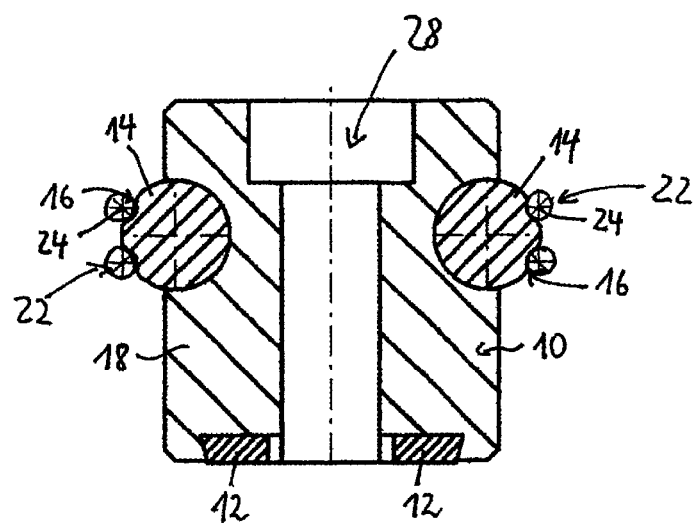
FIG. 4 a sectional view of a guide rail in accordance with a fourth embodiment.

The embodiments of the guide rail 10 shown in FIGS. 2 to 4 are engaged around from the outside by a slide, not shown. The guide elements 14 for this purpose lie on oppositely disposed outer surfaces of the guide rail 10. These embodiments essentially differ from one another by the cross-sectional shape of the guide elements 14. Whereas the guide element 14 shown in FIG. 2 has a trapezoidal base shape having a cut-out for the reception of roller elements 24, the guide elements 14 of the embodiments shown in FIGS. 3 and 4 have a substantially circular base shape. Chamfers (FIG. 3) or notches (FIG. 4) can be shaped at the substantially circular profile for the guiding of roller elements 24.

Figure 5:
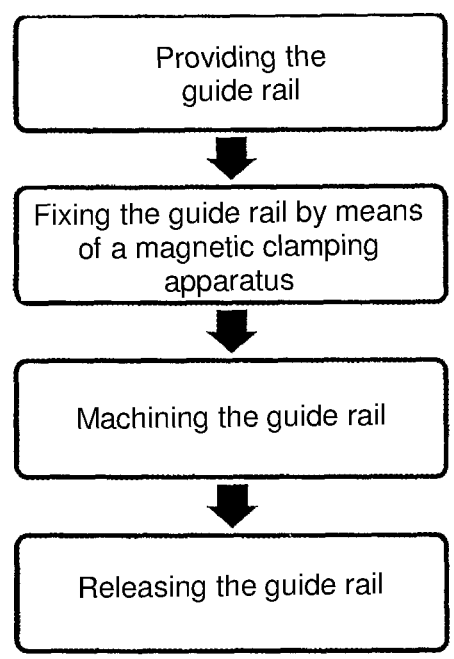
FIG. 5 a flowchart of an embodiment of the method in accordance with the invention for machining a transfer system.

FIG. 5 shows a flowchart for a method of machining a transfer system for the transport of objects. In a first step, a guide rail 10 is provided. The guide rail 10 comprises a light metal base body 18 and a magnetic fixing means 12. The fixing means 12 makes it possible to temporarily fasten, i.e. to fix, the guide rail 10 by means of a magnetic clamping apparatus, not shown. In a second step, the guide rail 10 is fixed in or at a machining apparatus by means of the magnetic clamping apparatus. A magnetic field is generated for this purpose, for example by one or more magnets, in particular electromagnets, that cooperates with the magnetic fixing means 12 and provides a firm, force-transmitting connection between a machining apparatus and the guide rail 10.

The guide rail 10 is subsequently machined in a third step. This step can comprise the introduction of a guide element 14, the grinding of a guide surface 16 of the guide element 14 as well as additional and/or alternative machining steps. On completion of the machining, the guide rail 10 is released from the machining apparatus again by a deactivation of the magnetic clamping apparatus, for example by switching off the electromagnet(s). Another section of the guide rail 10 or another component can now be machined.

It is possible by the method described above to machine the guide rail 10 without it being tensioned or even deformed by spot loads such as occur with compound linear guides clamped in a known manner. If the guide rail 10 is substantially installed in a transfer system, it is ensured that it is aligned exactly as it was during the machining. This is in particular of importance if the step of machining comprises the machining of the guide element 14, in particular of the guide surface 16. The exactly fitting installation of the guide rail 10 is therefore ultimately substantially simplified. A readjustment of the rail 10 is as a rule no longer necessary on the assembly.

Whereas the machining of a guide rail 10 and a subsequent attachment of the guide rail 10 to a transfer system is described here, it is also conceivable to machine a total module, comprising a plurality of guide rails 10 connected to one another, with the aid of the described method.

It can therefore be stated in summary that it is inter alia ensured by the tension-free or twist-free temporary fastening of the guide rail 10, that is made possible by the at least one magnetic fixing means 12, that the at least one guide surface 16 is in the same position or at least in a well-defined position with respect to a reference surface or a reference system in both a machining state and a state of use. The machining of the guide rail 10 is thereby substantially simplified and the precision of the components decisive for the guiding of the slide 20 is increased.

REFERENCE NUMERAL LIST 10 guide rail
12 fixing means
14 guide element
16 guide surface
18 light metal base body
20 slide
22 bearing
24 roller element
26 guide part
28 countersink

The invention claimed is:

1. A transfer system for the transport of objects, comprising:
    a guide rail that has a light metal base body and at least one guide element connected to the light metal base body and having a guide surface;
    a slide for the reception of at least one object; and
    a bearing that comprises at least one roller element bearing that cooperates with the guide element and that linearly displaceably supports the slide at the guide rail,
    with the guide rail having at least one magnetic fixing means that allows temporary fastening of the guide rail by magnetic clamping.

2. The transfer system in accordance with claim 1, wherein the guide rail has the at least one magnetic fixing means for machining of the guide surface.

3. The transfer system in accordance with claim 1, wherein the at least one magnetic fixing means is a real.

4. The transfer system in accordance with claim 1, wherein the at least one magnetic fixing means is attached to at least one outer side of the guide rail.

5. The transfer system in accordance with claim 4, wherein the at least one magnetic fixing means defines a contact plane spaced apart from the outer side of the guide rail.

6. The transfer system in accordance with claim 1, comprising at least two fixing means, with at least one fixing means provided at each of two outer sides of the guide rail.

7. The transfer system in accordance with claim 6, wherein the two outer sides are arranged inclined with respect to one another.

8. The transfer system in accordance with claim 1, wherein the guide rail engages around the slide at least partly from the outside.

9. The transfer system in accordance with claim 1, wherein the slide engages around the guide rail at least partly from the outside.

10. The transfer system in accordance with claim 1, wherein the at least one fixing means is let into a groove.

11. The transfer system in accordance with claim 10, wherein the groove is trapezoidal.

12. The transfer system in accordance with claim 1, wherein the at least one magnetic fixing means is formed from a ferromagnetic or ferrimagnetic material.

13. The transfer system in accordance with claim 12, wherein the at least one magnetic fixing means is formed from steel or iron.

14. The transfer system in accordance with claim 1, wherein the bearing comprises at least one roller element bearing in the manner of a ball bearing guide.

15. A method of machining a transfer system for the transport of objects, comprising the steps of:
    providing a guide rail that comprises a light metal base body and a magnetic fixing means that allows a temporary fastening of the guide rail by means of a magnetic clamping apparatus;
    fixing the guide rail in or at a machining apparatus by magnetic clamping;
    machining the guide rail; and
    releasing the guide rail.

16. The method in accordance with claim 15, wherein the guide rail includes a guide element for supporting a slide at the guide rail, and the step of machining the guide rail comprises the machining of the guide element.

17. The method in accordance with claim 16, wherein the step of machining comprises an introduction of the guide element into the guide rail.

18. The method in accordance with claim 17, wherein the guide element is introduced into the guide rail by rolling in or by adhesive bonding.

19. The method in accordance with claim 15, wherein the step of machining comprises grinding a guide surface of the guide element.

20. The method in accordance with claim 15, wherein the step of fixing of the guide rail is carried out by means of an electromagnet of the magnetic clamping apparatus.

* * * * *